(12) United States Patent
Watanabe et al.

(10) Patent No.: US 7,529,771 B2
(45) Date of Patent: May 5, 2009

(54) METHOD OF AND APPARATUS FOR GATHERING INFORMATION, SYSTEM FOR GATHERING INFORMATION, AND COMPUTER PROGRAM

(75) Inventors: Masami Watanabe, Shizuoka (JP); Hirohisa Fukuyama, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 611 days.

(21) Appl. No.: 10/853,972

(22) Filed: May 25, 2004

(65) Prior Publication Data

US 2005/0108259 A1    May 19, 2005

(30) Foreign Application Priority Data

Nov. 14, 2003    (JP)    ............... 2003-385679

(51) Int. Cl.
    *G06F 7/00*    (2006.01)
(52) U.S. Cl. ..................... 707/104.1; 707/10
(58) Field of Classification Search ............... 707/100, 707/104.1, 8–10, 101; 709/229, 224
    See application file for complete search history.

(56) References Cited

U.S. PATENT DOCUMENTS

| | | | | |
|---|---|---|---|---|
| 5,991,773 A | | 11/1999 | Tagawa | ................... 707/10 |
| 6,401,077 B1 * | | 6/2002 | Godden et al. | ............... 709/219 |
| 2003/0217144 A1 * | | 11/2003 | Fu et al. | ................... 707/104.1 |
| 2003/0217162 A1 * | | 11/2003 | Fu et al. | ................... 709/229 |
| 2004/0044767 A1 * | | 3/2004 | Rivers et al. | ................ 709/225 |
| 2006/0259553 A1 * | | 11/2006 | Kawakita | ................... 709/205 |

FOREIGN PATENT DOCUMENTS

| | | |
|---|---|---|
| EP | 1 160 692 A2 | 12/2001 |
| JP | 09-297703 | 11/1997 |
| JP | 10-207759 | 8/1998 |
| JP | 2002-055869 | 2/2002 |

OTHER PUBLICATIONS

Microsoft Press Computer Dictionary 3rd edition, copyright @ 1977, p. 459.*
Save the Disappearing Web-Pages!; Electronic Library Promotion Office, General Admin. Dept., Planning Division, the National Diet Library; Dec. 4, 2002; URL:http://www.asahi-net.or.jp/~ax2s-kmtn/internet/dina.html.
Way Back Machine; Mar. 10, 2004; URL:http//www.archive.org/.

* cited by examiner

*Primary Examiner*—Wilson Lee
(74) *Attorney, Agent, or Firm*—Greer, Burns & Crain, Ltd

(57) ABSTRACT

An information-gathering system includes a web archive that stores a first web-page with a first address and first generation information corresponding to the first web-page, a determining unit that determines whether a linked web-page specified in the first web-page is stored in the web archive based on a second address of the linked web-page and second generation information corresponding to the second web-page, and an information gathering unit that gathers the linked web-page via the network based on the second address when the determining unit determines that the linked web-page is not stored in the web archive.

4 Claims, 13 Drawing Sheets

FIG.2

| URL | DATE OF GATHERING | FILE NAME | HTTP HEADER | |
|---|---|---|---|---|
| http://aaa/ | 20030330 | xxxxxxxx.html | HTTP/1.0 200 OK<br>Content-Type: text/html<br>Proxy-Connection: close | |
| http://bbb/ | 20030330 | yyyyyyyy.html | HTTP/1.0 200 OK<br>Content-Type: text/html<br>Proxy-Connection: close | |

32a

FILE yyyyyyyy.html → CONTENTS OF WEB PAGE "http://bbb/" GATHERD ON MARCH 3, 2003

| URL | FLAG |
|---|---|
| http://ddd/ | OFF |
| http://eee/ | OFF |
| http://f f f / | OFF |
| ⋮ | ⋮ |

32c

RESULT OF SEARCH OR BROWSING

Web ARCHIVE
   PAGE OF GENERATION LIST
   OF Web PAGE A

MARCH 2003
   DECEMBER 2002
   SEPTEMBER
   JUNE

METHOD OF AND APPARATUS FOR GATHERING INFORMATION, SYSTEM FOR GATHERING INFORMATION, AND COMPUTER PROGRAM

BACKGROUND OF THE INVENTION

1) Field of the Invention

The present invention relates to technology to efficiently gather and store web pages.

2) Description of the Related Art

Today's internet offers various kinds of information some of which may disappear by being changed or moved. Recently, some of the developed countries have started to experimentally perform an activity of gathering, storing, and permanently saving such information on the internet to preserve the cultural property (see Nobuki Hirose, "Save the disappearing web-pages! The web archiving is changing", Database No. 21, Japan Database Industry Association, Dec. 4, 2002 ("http://www.asahi-net.or.jp/~ax2s-kmtn/internet/dina.html")). Another example of such activity is a web archiving system using a web robot, which is disclosed in the web site of "Way Back Machine" (http://www.archive.org/). The web robot gathers web pages on the internet and stores the web pages in a web archive by performing a link analysis. When a web page is stored in the web archive and the web page includes a link that represents another web page (hereinafter, "a linked web-page"), the web robot analyzes the link automatically, traces the link, and gathers the linked web-page. In this manner, the web robot stores the linked web-pages sequentially.

However, although the web robot can analyze a link described in the HTML file, the web robot cannot analyze a link that exists in various types of word-processing documents, application data, or multimedia data on the internet. Moreover, even if the link is described in the HTML file, the web robot cannot analyze the link when the link is generated dynamically by various types of scripts. In such cases, the web robot has a difficulty in gathering the linked web-page automatically.

Consequently, the web page stored in the web archive still has a lot of information that the web robot misses gathering (hereinafter, "missed information"). There is no way to detect a successful gathering of the information, therefore, people need to cover the missed information by seeing the inside of each web page gathered one by one while checking the web pages stored in the web archive.

The conventional technology has a difficulty in finding a right place where the missed information can be acquired, and as a result, the missed web-page, which is a web page that is omitted while being gathered, cannot be acquired efficiently.

To gather the web pages whose links exist in various types of word-processing documents, application data, or multimedia data, the data need to be opened using a corresponding application. The link can be acquired when the data is opened and the link is displayed in the data. On the other hand, if the data cannot be opened and the links is not displayed in the data, the link cannot be acquired and the missed information cannot be recovered.

Moreover, when the information about an in-line image (such as a static image and a moving image), which is generated by script in the HTML file, is missing, it is required to presume where the in-line image is linked by referring to the script described in the source of the HTML file. Additionally, to gather the script web-page, which is linked and generated by the script in the HTML file, the script web-page needs to be acquired from the uniform resource locator (URL) displayed using the web browser by clicking the link.

SUMMARY OF THE INVENTION

It is an object of the present invention to solve at least the problems in the conventional technology.

The information-gathering apparatus according to one aspect of the present invention includes a storing unit that acquires information on a first address of a first web-page from a server having a web archive that stores the first address and the first web-page corresponding to the first address, and stores the first address in a gathered-address table; an access-log acquiring unit that accesses the first web-page based on the first address stored in the gathered-address table, accesses a second web-page linked to the first web-page, and acquires a second address of the second web-page as an access log; a determining unit that determines whether the second address is stored in the gathered-address table; and an information gathering unit that gathers the second web-page via the network based on the second address when the second address is not stored in the gathered-address table.

The information-gathering system according to another aspect of the present invention includes a web archive that stores a first web-page with a first address and first generation information corresponding to the first web-page; a determining unit that determines whether a linked web-page specified in a second web-page that is being referred is stored in the web archive based on a second address of the linked web-page and second generation information corresponding to the second web-page; and an information gathering unit that gathers the linked web-page via the network based on the second address when the determining unit determines that the linked web-page is not stored in the web archive.

The information-gathering method according to still another aspect of the present invention includes gathering a first web-page on a network; storing the first web-page and a first address corresponding to the first web-page in a web archive; acquiring information on a second address of a linked web-page specified in a second web-page that is being referred from a terminal; determining whether the linked web-page is stored in the web archive; and gathering the linked web-page via the network based on the second address when the linked web-page is not stored in the web archive.

The information-gathering method according to still another aspect of the present invention includes steps of acquiring information on a first address of a first web-page from a server having a web archive that stores the first address and the first web-page corresponding to the first address; storing the first address in a gathered-address table; accessing the first web-page based on the first address stored in the gathered-address table; accessing a second web-page linked to the first web-page; acquiring a second address of the second web-page as an access log; determining whether the second address is stored in the gathered-address table; and gathering the second web-page via the network based on the second address when the second address is not stored in the gathered-address table.

The information-gathering program according to still another aspect of the present invention realizes the methods according to the above aspects on a computer.

The other objects, features, and advantages of the present invention are specifically set forth in or will become apparent

BRIEF DESCRIPTION OF THE DRAWINGS

FIG. 2 is a table of an example of information stored in a management-information database;

DETAILED DESCRIPTION

Exemplary embodiments of a method of and an apparatus for gathering information, a system for gathering information, and a computer program according to the present invention are explained in detail with reference to the accompanying diagrams.

A main feature of an information-gathering system according to a first embodiment of the present invention is to perform a determining process and an information-gathering process. By performing these processes, the web pages that miss being gathered, which may be called a missed web-page, can be gathered efficiently. In the determining process, 1) the web page that is gathered (hereinafter, "a gathered web-page") is stored in the web archive while correlating the address of the gathered web-page with generation information, which indicates when the web page is gathered and may be called a gathering date; and
2) whether the web page that the link represents is stored in the web archive is determined based on the URL of the linked web-page specified in the web page that is being referred and the generation information of the web-page that is being referred.

In the information-gathering process, the linked web-page specified in the web page is gathered via the network based on the address of the linked web-page when it is determined that the linked web-page is not stored in the web archive.

Figure 1:
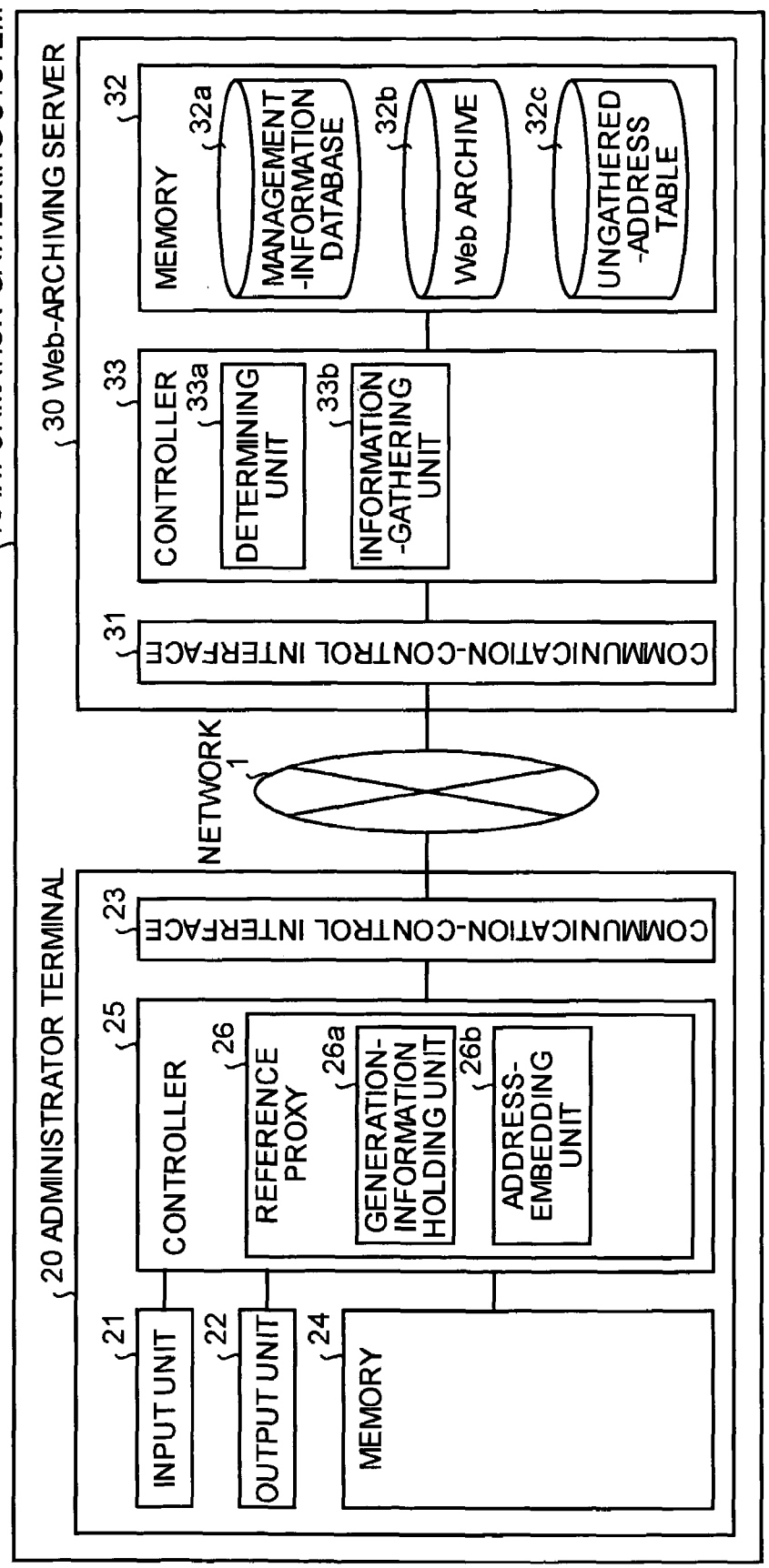
FIG. 1 is a block diagram of an information-gathering system according to a first embodiment of the present invention.

FIG. 1 is a block diagram of an information-gathering system 10 according to the first embodiment. In the information-gathering system 10, an administrator terminal 20 and a web-archiving server 30 are connected via a network 1 (internet or intranet) to communicate each other.

The administrator terminal 20 includes a communication-control interface 23, an input unit 21, an output unit 22, a memory 24, and a controller 25. The communication-control interface 23 controls the communication of various types of information between the administrator terminal 20 and the network 1.

The input unit 21 inputs various types of information such as a command, and examples of the input unit 21 are a keyboard, a mouse, and a track ball. The input unit 21 receives:

1) the information to perform the search or the browsing of a web page to be referred;
2) the information to select the generation information from the page that shows the generation list of the web page, which is a result of the search or the browsing; and
3) the information to specify the URL of the linked web-page in the web page that is being referred.

When the web pages stored in the web archive are checked, the web pages are displayed one-by-one. Preferably, 1) when the web page includes a static image to be displayed automatically or a moving image to be displayed automatically, it is required to wait till the image is displayed;
2) when the web page includes any actions that occur by detecting the position of the mouse cursor, the input unit 21 receives the information about the movement of the mouse cursor;
3) when the web page includes the link to other information, the input unit 21 receives the information to specify the URL of the linked information; and
4) all pages are displayed based on user's operation command. These actions are respectively requested as a URL request from the web application, which the user uses, to a reference PROXY 26.

The output unit 22 is a unit to output various types of information, and an example of the output unit 22 is a monitor. The output unit 22 displays:

1) a screen to perform the search or the browsing of a web page to be referred;
2) the page that shows the generation list of the web page; and
3) the web page acquired by the reference PROXY 26.

The memory 24 stores data and computer programs that the controller 25 and the reference PROXY 26 require in performing the processes. The memory 24 stores the contents of the web page that the reference PROXY 26 acquires, and a computer program, which is downloaded from the web-archiving server 30, of the reference PROXY 26, a generation-information holding unit 26a, and an address-embedding unit 26b.

The controller 25 includes an internal memory that stores control computer-programs, such as operating system (OS), computer programs for each process, and required data, and performs each process using the control computer-programs, the computer programs and the data that are stored in the internal memory. From a functional viewpoint, the controller 25 includes the reference PROXY 26, the generation-information holding unit 26a, and the address-embedding unit 26b.

The generation-information holding unit 26a holds the generation information of the web page that is specified when the search or browsing of the web page is performed over a web archive 32b. When the search or the browsing of the web page is performed, the reference PROXY 26 issues a request for acquiring the web page (hereinafter, "a web-page acquiring request"). In response to the web-page acquiring request from the reference PROXY 26, an HTTP header is returned from the web-archiving server 30 with the web page. The HTTP header includes the information "WASet-PROXY: a gathering date". Therefore, the generation-information holding unit 26a holds the gathering date in the HTTP header as the generation information. The generation-information holding unit 26a is configured to hold the generation information so that the generation information of the web page that the user refers to can be configured automatically.

The address-embedding unit 26b embeds the address of the web-archiving server 30 in the URL of the linked web-page specified in the web page that is being referred when the generation-information holding unit 26a holds the generation information (namely, when generation to be referred is configured automatically). More precisely, the URL of the CGI for taking the web page (namely, the URL of the web archiving sever 30) and the generation information (namely the gathering date) are embedded in the original URL of the linked web-page like "http://aaa/", namely the URL of the linked web-page that has not been gathered. Consequently, instead of issuing the HTTP request to the internet, the web application that refers to the web page in the web archive 32b issues the web-page acquiring request to the web-archiving server 30.

The reference PROXY 26 acts as proxy for the web browser or the web application and acquires the web page from the web archive 32b via the web-archiving server 30. More precisely, the reference PROXY 26 issues the web-page acquiring request to the web-archiving server 30 based on the URL that the address-embedding unit 26b modifies. When the linked web-page is stored in the web archive 32b, the reference PROXY 26 acquires the linked web-page from the web archive 32b. When the linked web-page is not stored in the web archive 32b, namely the linked web-page is not gathered, the web-archiving server 30 informs the reference PROXY 26 that the web page is to be gathered via network.

The web archiving server 30 includes a communication-control interface 31, a memory 32, and a controller 33. The communication controller 31 controls various types of information between the web-archiving server 30 and the network 1.

The memory 32 stores data and computer programs that the controller 33 requires in performing the processes. From a functional viewpoint, the memory 32 includes a management-information database 32a, the web archive 32b, and an ungathered-address table 32c.

The management-information database 32a stores the management information of the web archive 32b that stores the gathered web-pages. More precisely, the management-information database 32a stores the URL of the gathered web-page, the gathering date, and the storage location of the contents of the gathered web-page, as shown in FIG. 2.

The web archive 32b stores the contents of the web page, which the controller 33 gathers via the network, based on the management information stored in the management-information database 32a.

Figures 3, 4:
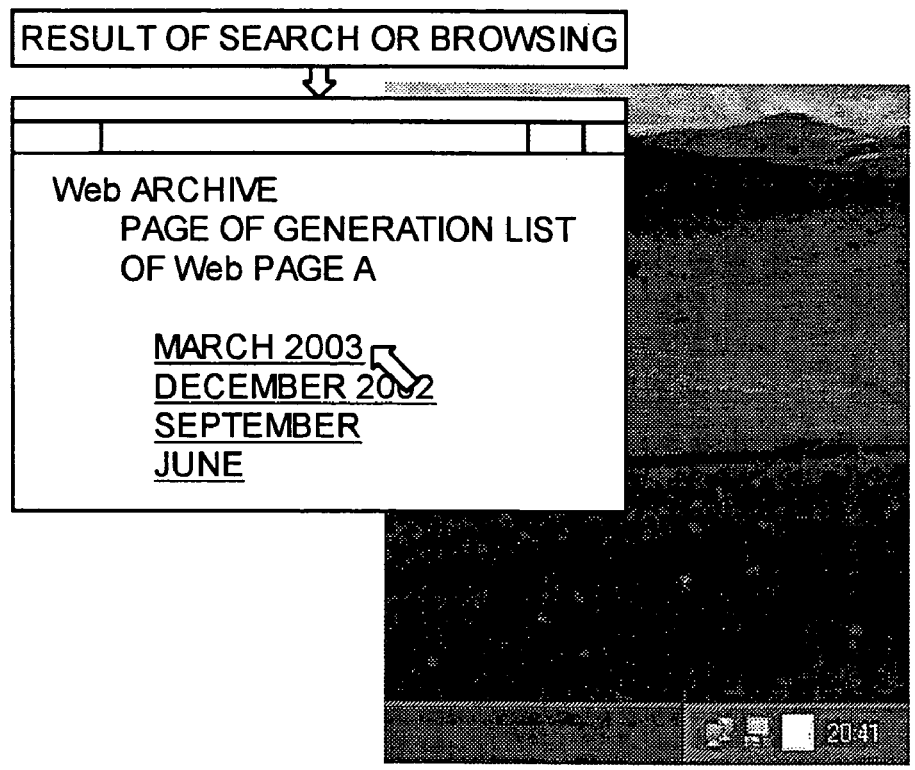
FIG. 3 is a table of an example of information stored in an ungathered-address table.
FIG. 4 is an example of a screen displayed on an output unit.

When a determining unit 33a determines that the web page is not stored in the web archive 32b, the ungathered-address table 32c stores the address of the web page. As shown in FIG. 3, the URL of the ungathered web-page and a flag are stored in a correlated manner in the ungathered-address table 32c. The flag indicates whether the web page located at the address, corresponding to the flag, is stored in the archive 32b. In other word, the flag is on when the web page located at the address, corresponding to the flag, is stored in the archive 32b, and the flag is set to OFF when the web page located at the address, corresponding to the flag, is not stored in the archive 32b.

The controller 33 includes an internal memory that stores control computer-programs, such as OS, computer programs for each process and required data, and performs each process using the control computer-programs, computer programs and the required data that are stored in the internal memory (examples of the processes are a process of searching the management-information database 22a in response to the web-page acquiring request from the administrator terminal 20, and a process of responding to the web-page acquiring request). From a functional viewpoint, the controller 33 includes the determining unit 33a and an information-gathering unit 33b.

The determining unit 33a determines whether the linked web-page specified in the web page that is being referred is stored in the web archive 32b based on the address of the linked web-page and the generation information of the web page that is being referred. More precisely, when the reference PROXY 26 issues the web-page acquiring request, the determining unit 33a searches the management-information database 32a based on the URL of the linked web-page and the generation information that the generation-information holding unit 26a holds. Consequently, the determining unit 33a determines whether the linked web-page is stored in the web archive 32b.

When the determining unit 33a determines that the linked web-page is stored in the web archive 32b, the determining unit 33a builds information (web page) while referring to the web archive 32b, and returns the information to the reference PROXY 26. When the determining unit 33a determines that the linked web-page is not stored in the web archive 32b, the determining unit 33a informs the administrator terminal 20 that the linked web-page is not gathered, and registers the URL of the linked web-page that is not gathered with the ungathered-address table 32c.

The information-gathering unit 33b gathers the web pages on the network using the web robot. More precisely, the information-gathering unit 33b sequentially extracts the URLs that are registered with the ungathered-address table 32 and have a flag that is set to OFF. Then the information-gathering unit 33b gathers the web page that the URL represents via the network, sets the flag on, and stores the web-page in the web archive 32b.

Figure 5:
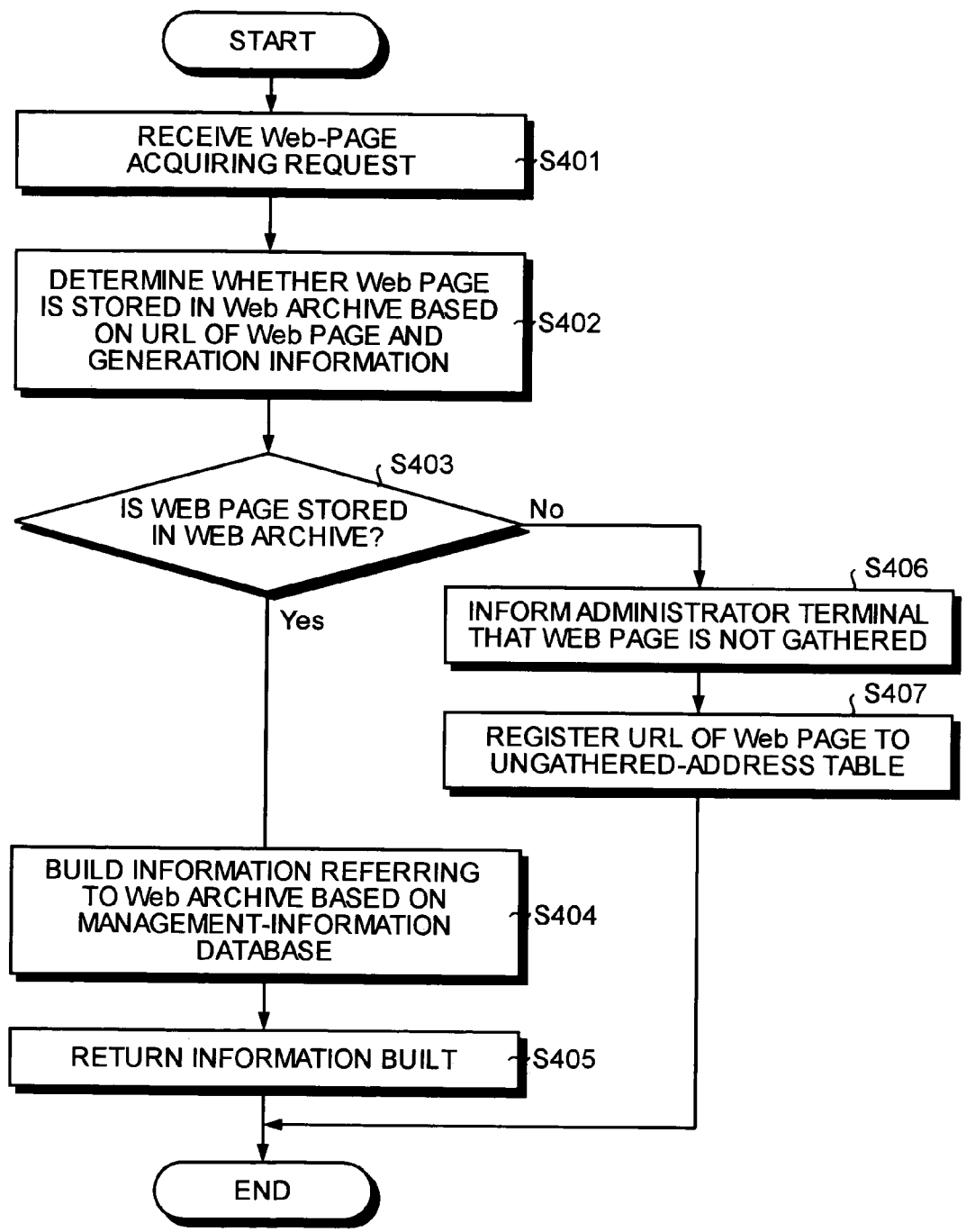
FIG. 5 is a flowchart of a determining process according to the first embodiment.

FIG. 5 is a flowchart of a determining process according to the first embodiment. The determining unit 33a receives the web-page acquiring request that the reference PROXY 26 issues (step S401), searches the management-information database 32a based on the URL of the linked web-page specified in the web page that is being referred and the generation information that the generation-information holding unit 26a holds, and determines whether the linked web-page is stored in the web archive 32b (step S402).

If the linked web-page is stored in the web archive 32b (step S403/Yes), the determining unit 33a builds information (web page) based on the management information, which is stored in the management-information database 32a, of the web archive 32b while referring to the web archive 32b (step S404), and returns the information to the reference PROXY 26 (step S405).

If the linked web-page is not stored in the web archive 32b (step S403/No), the determining unit 33a informs the administrator terminal 20 that the linked web-page is not gathered (step S406), and registers the URL of the linked web-page that is not gathered with the ungathered-address table 32c (step S407).

Consequently, the web pages stored in the web archive 32b can be checked by following the links and referring to the web-pages that the links represent.

Figure 6:
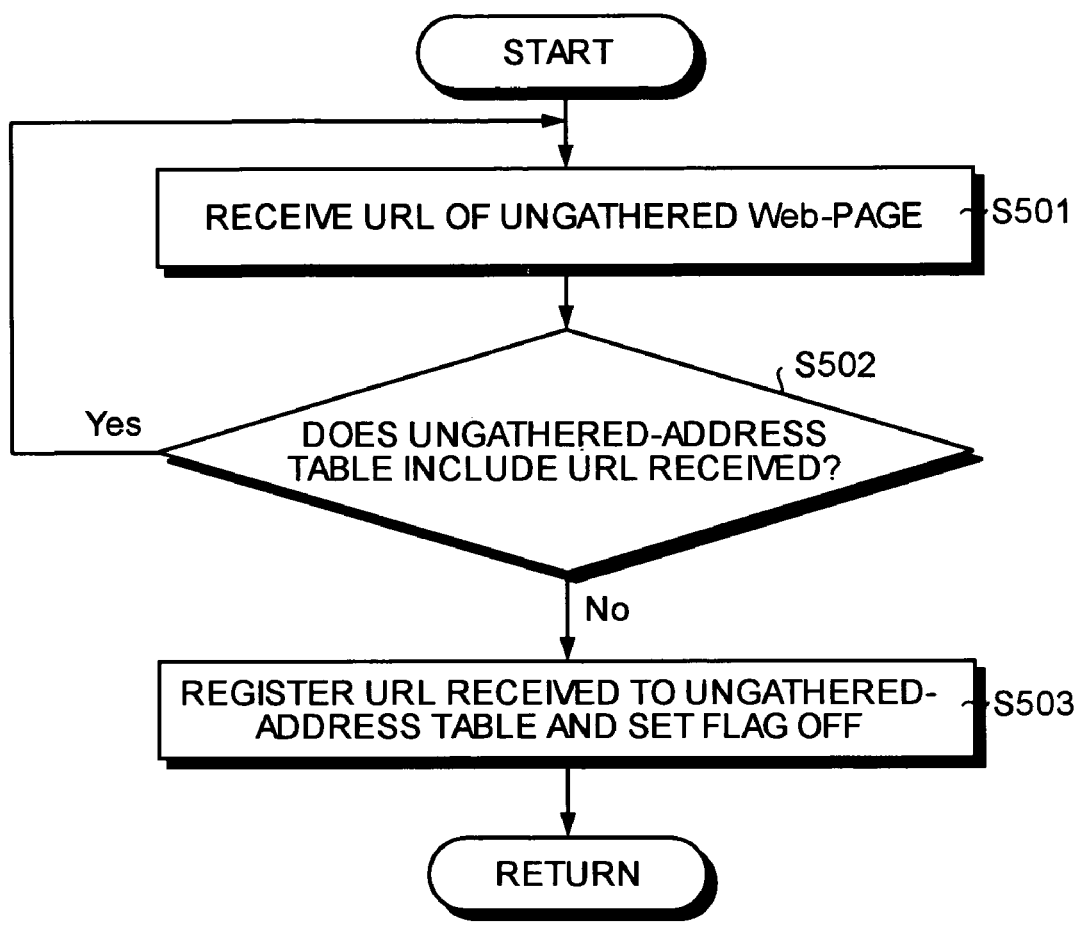
FIG. 6 is a flowchart of a registering process according to the first embodiment.

FIG. 6 is a flowchart of a registering process according to the first embodiment. The controller 33 receives the URL of the ungathered web-page (from the determining unit 33a or the input unit 21 of the administrator terminal 20) (step S501), and searches the ungathered-address table 32c for the URL (step S502). When the ungathered-address table 32c does not include the URL (step S502/No), the controller 33 registers the URL with the ungathered-address table 32c and set the flag, corresponding to the URL, off (step S503).

In this manner, by managing the ungathered web-pages in the table, the address of the missed web-page, which is detected by one or a plurality of the administrator terminals 20, can be consolidated.

Figure 7:
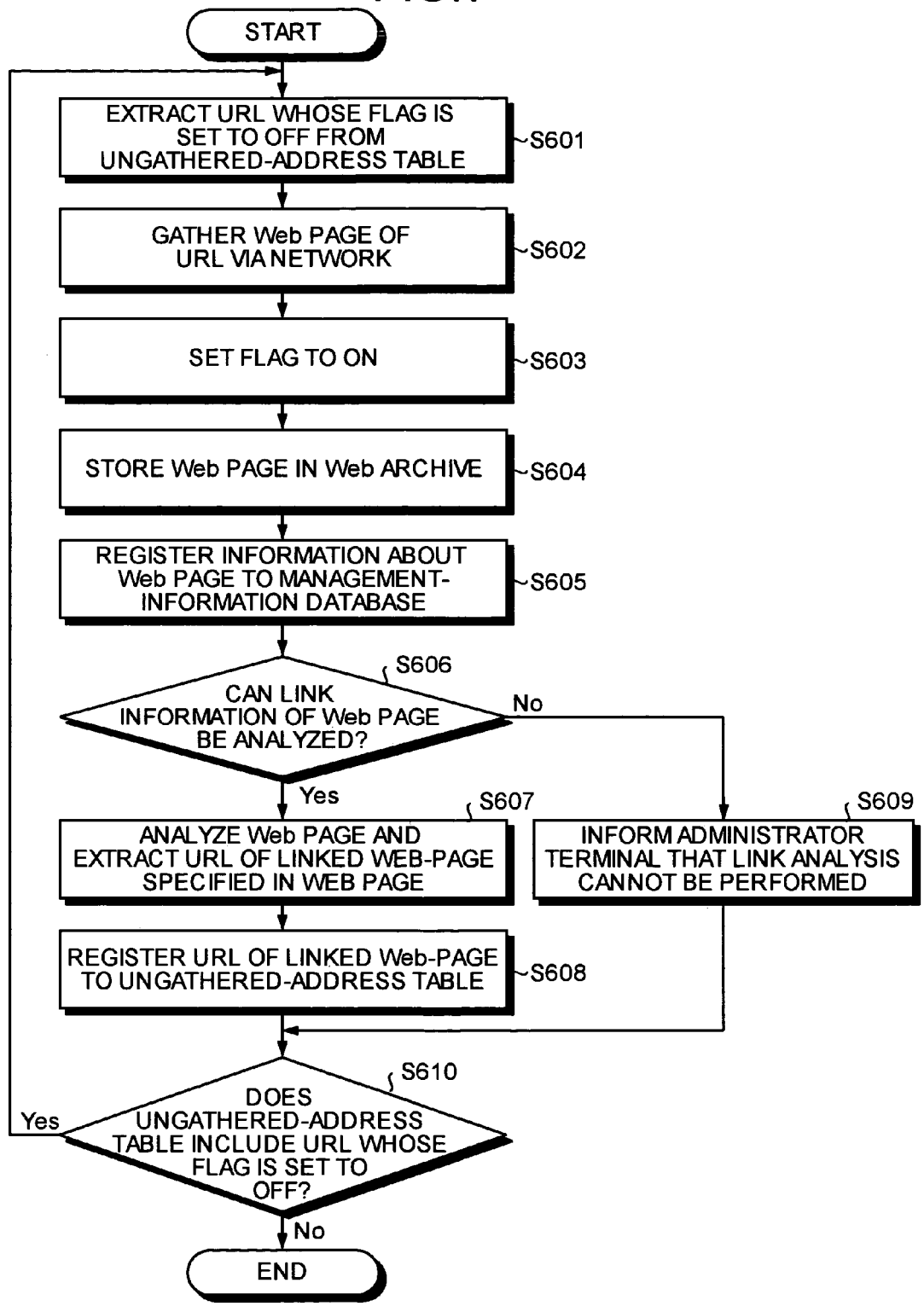
FIG. 7 is a flowchart of an information gathering process according to the first embodiment.

FIG. 7 is a flowchart of an information gathering process according to the first embodiment. The information-gathering unit 33b extracts the URL whose flag is set to OFF from the ungathered-address table 32c (step S601), and gathers the web page that the URL represents via the network (step S602). Then, the information-gathering unit 33b sets the flag, corresponding to the URL, on (step S603), stores the web page in the web archive 32b (step S604), and registers the information about this web page with the management-information database 32a 8step S605).

If the web robot that the information-gathering unit 33b includes can perform the link analysis of the web page (step S606/Yes), the information-gathering unit 33b performs the link analysis and extracts the link information (the URL of the linked web-page) (step S607). When the ungathered-address table 32c does not include the address of the linked web-page, the information-gathering unit 33b registers the address of the linked web-page with the ungathered-address table 32c (step S608).

If the web robot cannot perform the link analysis of the web page (step S606/No), the information-gathering unit 33b informs the administrator terminal 20 that the link analysis cannot be performed (step S609). If the ungathered-address table 32c still includes the URL whose flag is set to OFF (step S610/Yes), the information-gathering unit 33 repeats to follow the steps S601 to S609 till the ungathered-address table 32c does not include the URL whose flag is set to OFF. If the ungathered-address table 32c does not includes the URL whose flag is set to OFF (step S610/No), the operations end.

In this manner, according to the information-gathering system according to the first embodiment,
1) the gathered web-page and the address of the gathered web-page are stored in a correlated manner in the web archive;
2) the address of the linked web-page specified in the web page that is being referred is acquired from the terminal;
3) whether the linked web-page is stored in the web archive is determined; and
4) the linked web-page is gathered via the network based on the address of the linked web-page when it is determined that the linked web-page is not stored in the web archive.

Consequently, the missed web-pages can be gathered efficiently.

Moreover, according to the information-gathering system according to the first embodiment,
1) whether the linked web-page is stored in the web archive is determined based on the URL of the linked web-page specified in the web page that is being referred and the generation information of the web page that is being referred; and
2) the linked web-page is gathered via the network based on the address of the linked web-page when it is determined that the linked web-page is not stored in the web archive.

Consequently, the missed web-pages can be gathered efficiently by following the links and referring to the web pages that the links represent without checking the inside of the web pages.

A main feature of the information-gathering system 10 according to a second embodiment of the present invention is that the administrator terminal 20 performs an access-log acquiring process and a determining process. By performing these processes, the missed web-pages can be checked and gathered efficiently. In the access-log acquiring process,
1) the address of the web-page stored in the web archive is stored in a gathered-address table;
2) the web-page is accessed based on the address, which is stored in the gathered-address table, of the web page, and the linked web-page specified in the web-page is accessed; and
3) the address of the linked web-page is acquired as an access log. In the determining process, whether the address of the linked web-page is stored in the gathered-address table is determined.

Figure 8:
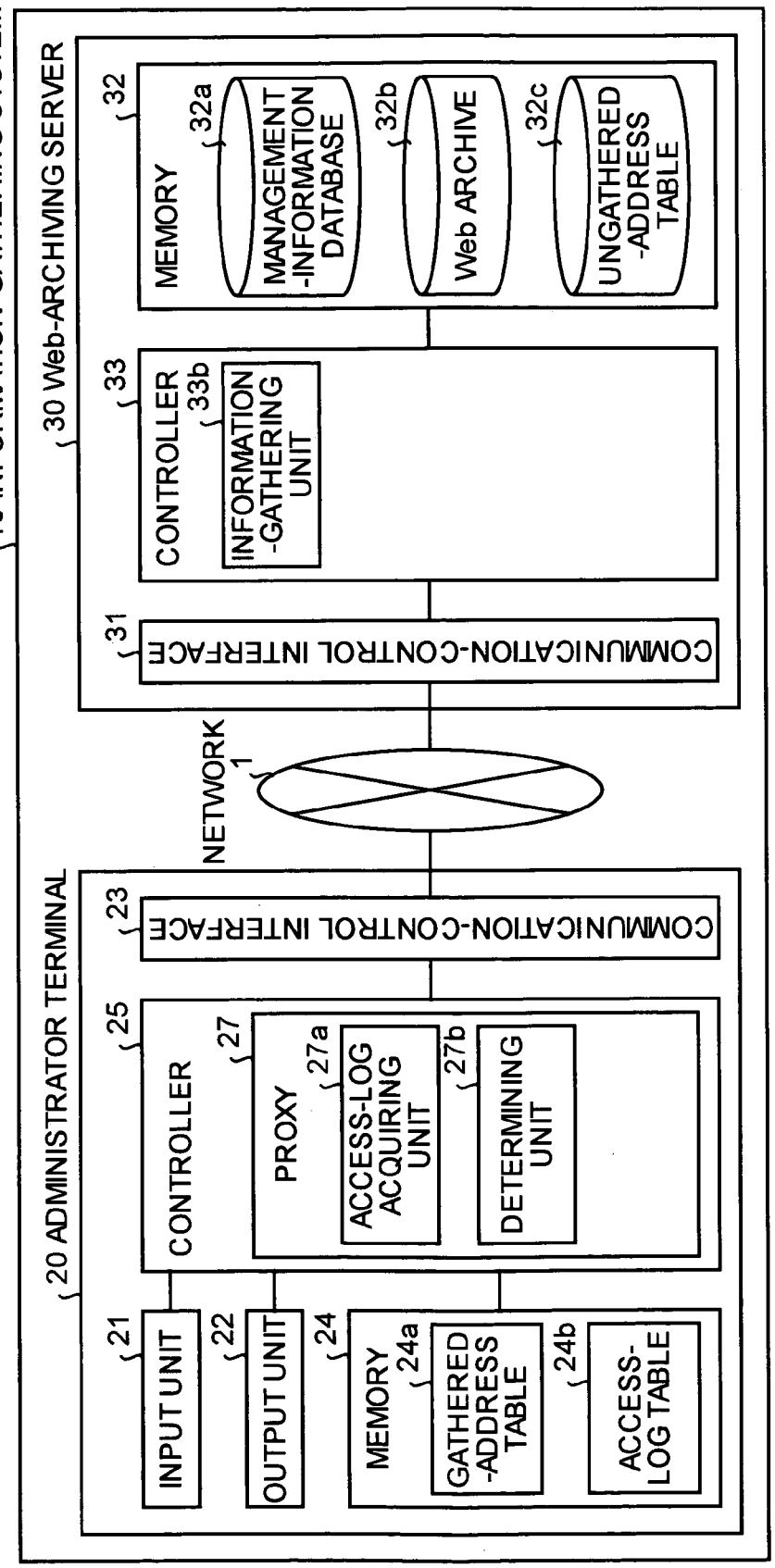
FIG. 8 is a block diagram of an information-gathering system according to a second embodiment of the present invention.

FIG. 8 is a block diagram of an information-gathering system according to a second embodiment of the present invention. In comparison to the information-gathering system 10 according to the first embodiment, a gathered-address table 24a and an access-log table 24b are added in the memory 24 and the reference PROXY 26 is replaced by a PROXY 27 in the information-gathering system 10 according to the second embodiment.

The gathered-address table 24a stores the addresses of the gathered web-pages stored in the web archive 32b, namely stores a list of the gathered URLs. The list may include the URLs of all web pages stored in the web archive 32b or lists which store the URLs broken into certain categories. The list of the gathered URLs is acquired from the web-archiving server 30 and updated regularly.

The access-log table 24b stores the addresses of the web pages that an access-log acquiring unit 27a accesses as an access log. More precisely, the access-log table 24b stores the URL of the web page that the access-log acquiring unit 27a accesses and the URL of a script web-page, which is operated by script when the web page that the access-long acquiring unit 27a accesses is output. The access-log table 24b stores the URL, the access time, and the access result (indicating whether the web page is accessed) in a correlated manner.

The PROXY 27 acts as PROXY for the web browser and acquires the web page on the network. From a functional viewpoint, the PROXY 27 includes the access-log acquiring unit 27a and a determining unit 27b.

The access-log acquiring unit 27a is a table that stores the address of the web page that the PROXY 27 accesses as an access log. More precisely, the access-log acquiring unit 27a acquires the URL of the script web-page by accessing the web page based on the address, which is stored in the gathered-address table 24a, of the web page and by accessing the script web-page in the web page.

The determining unit 27b determines whether the web page whose address is stored in the access-log table 24b is stored in the web archive 32b. More precisely, the determining unit 27b determines whether the address, which the access-log acquiring unit 27a acquires, of the script web-page is stored in the gathered-address table 24a.

In other words, the access-log acquiring unit 27a accesses the web page and the script web-page in the web page (such as an in-line image generated by script in the HTML file using a static image, or a moving image), and stores the addresses of both the web page and the script web-page in the access-log table 24b as an access log. Then when the address of the script web-page is not stored in the gathered-address table 24a, it is determined that the scrip web-page is not gathered. Consequently, the script web-page can be gathered efficiently by checking the table that shows the gathered script-web-pages.

Figure 9:
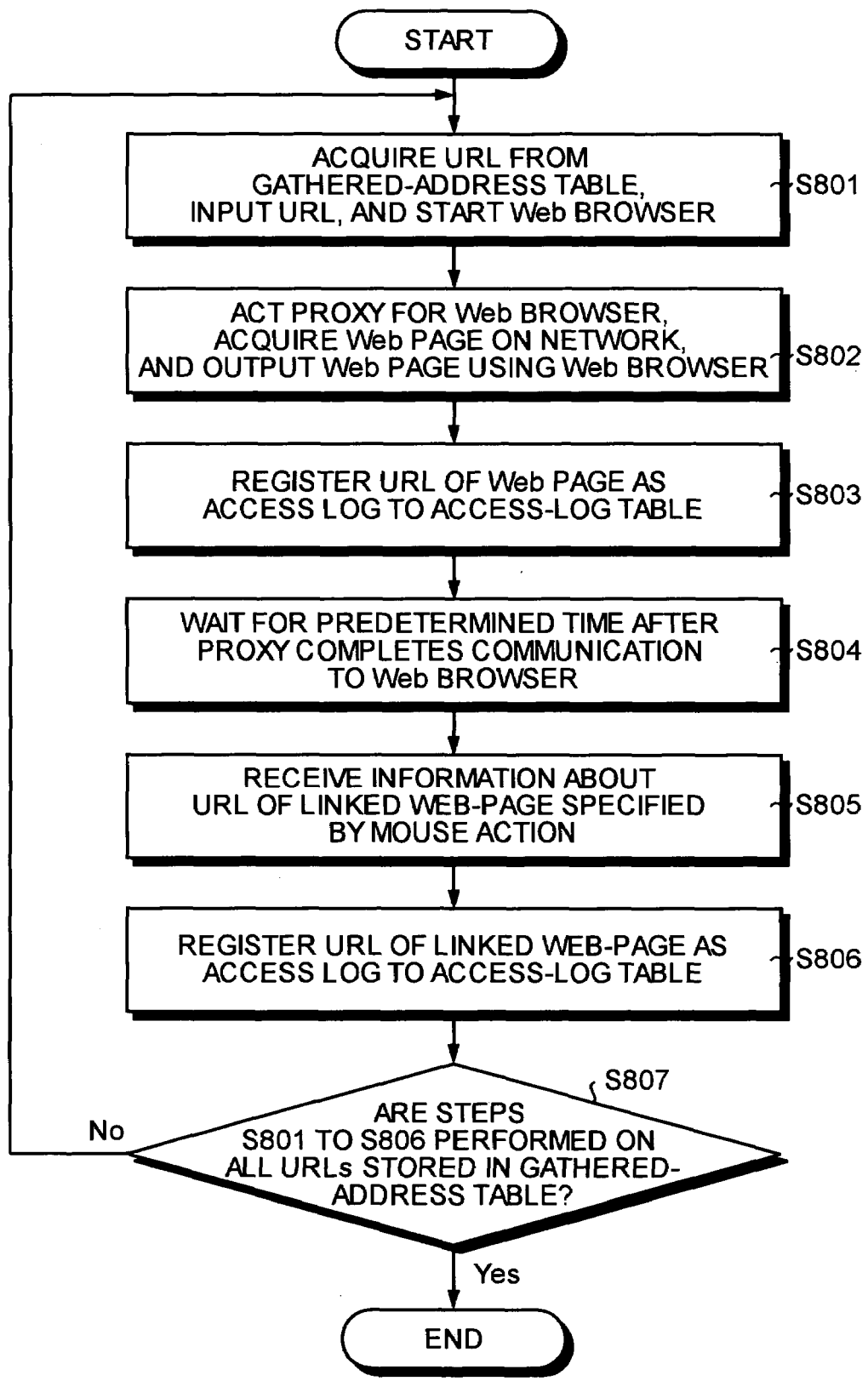
FIG. 9 is a flowchart of an access log acquiring process according to the second embodiment.

FIG. 9 is a flowchart of an access log acquiring process according to the second embodiment. The access-log acquiring unit 27a acquires the URL from the gathered-address table 24a, and boots the web browser by inputting the URL (step S801). Then the access-log acquiring unit 27a acts proxy for the web browser, acquires the web page on the network, and outputs the web page using the web browser (step S802), and registers the URL of the web page with the access-log table 24b (step S803).

After the PROXY 27 completes the communication with the web browser, the access-log acquiring unit 27a waits till the script web-page is output (step S804). After the script web-page is output, the address of the script web-page is acquired as an access log and registered with the access-log table 24b.

Then, the access-log acquiring unit 27a receives the information about the URL of the linked web-page specified by the mouse action (step S805), accesses the URL, and registers the URL with the access-log table 24b as an access log (step S806). After the steps S801 to S806 are performed on all URLs stored in the gathered-address table 24a, the operations end.

Figure 10:
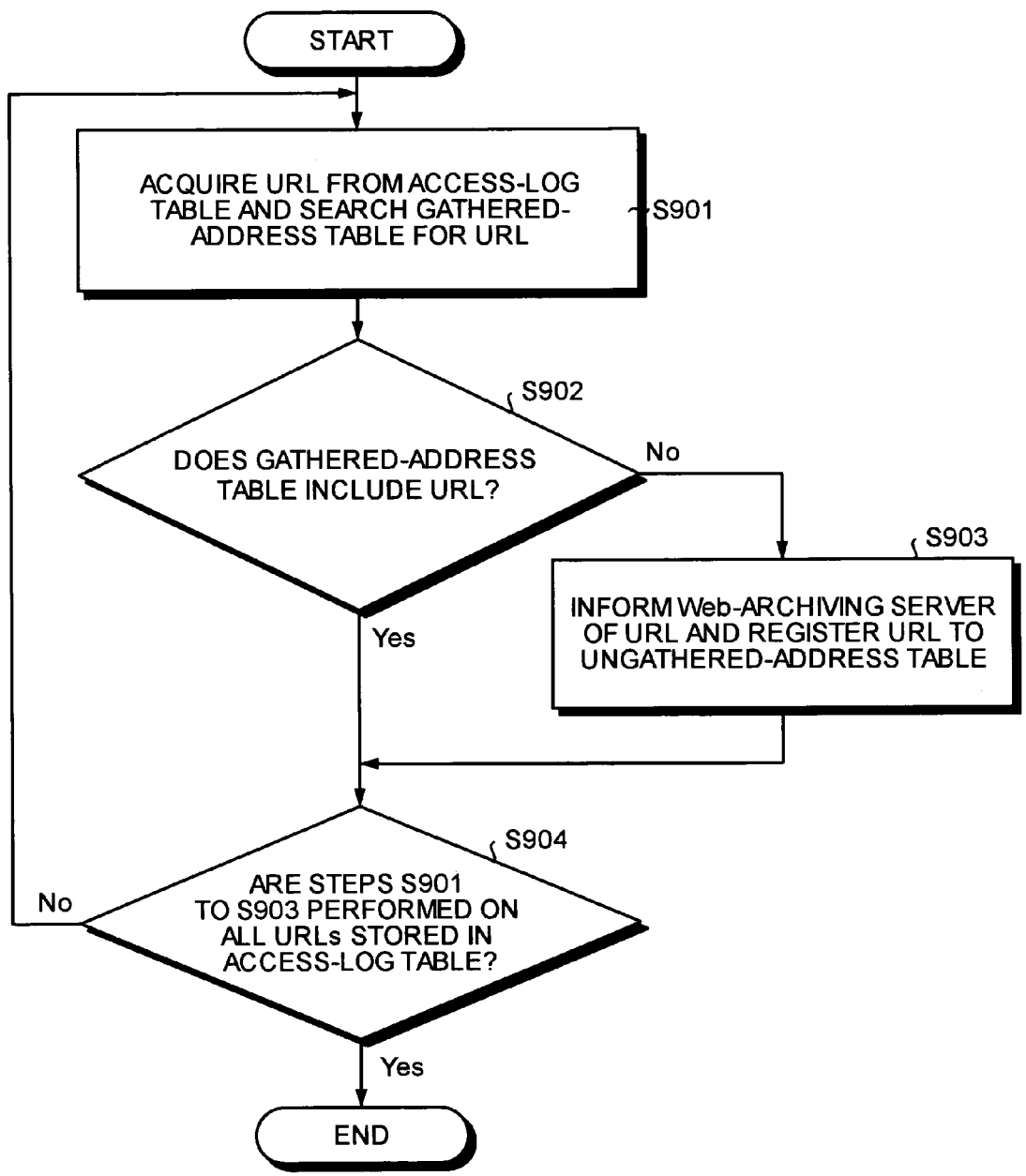
FIG. 10 is a flowchart of a determining process according to the second embodiment.

FIG. 10 is a flowchart of a determining process according to the second embodiment. The determining unit 27b acquires the URL from the access-log table 24b, and searches the gathered-address table 24a for the URL (step S901). When the gathered-address table 24a does not include the URL (step S902/No), the determining unit 27b informs the web-archiving server 30 that the URL is not in the gathered-address table 24a so that the URL is registered with the ungathered-address table 32c (step S903).

If the steps S901 to S903 are performed on all URLs stored in the access-log table 24b (step S904/Yes), the operations end. Subsequently, the operations for registering the ungathered web-page with the ungathered-address table 32c and the operations for gathering information (namely, gathering the web pages whose URL is registered with the ungathered-address table 32c) are performed in the same way as the first embodiment.

According to the gathering-information system according to the second embodiment, in the administrator terminal (an information-gathering apparatus), 1) the address of the web page is acquired from the server that includes the web archive;
2) the address of the web page is stored in the gathered-address table;
3) the address of the liked web-page specified in the web page is acquired as an access log by accessing the web page based on the address, which is stored in the gathered-address table, of the web page and accessing the linked web-page;
4) whether the address of the linked web-page is stored in the gathered-address table is determined; and
5) the linked web-page is gathered via the network based on the address of the linked web-page when it is determined that the address of the linked web-page is not stored in the gathered-address table. Consequently, the missed web-page can be gathered efficiently.

Moreover, according to the information-gathering system according to the second embodiment, in the administrator terminal, 1) the address of the script web-page is acquired as an access log by accessing the web page based on the address, which is stored in the gathered-address table, of the web page, and accessing the scrip web-page in the web page;
2) whether the address of the script web-page is stored in the gathered-address table is determined; and
3) the scrip web-page is gathered via the network based on the address of the script web-page when it is determined that the address of the script web-page is not stored in the gathered-address table. Consequently, when it is detected that the script web-page misses being gathered, the script web-page can be gathered efficiently.

Figure 11:
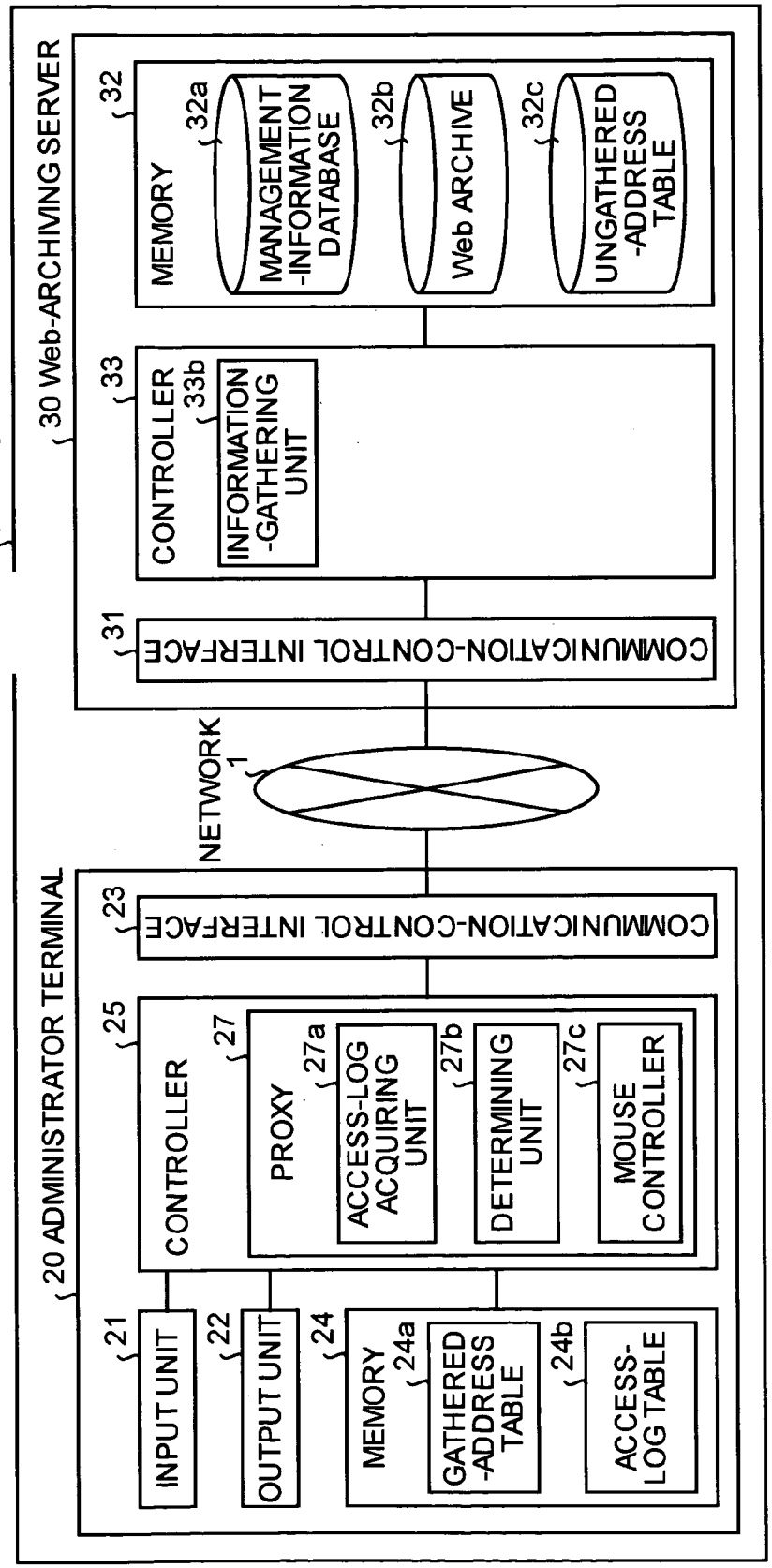
FIG. 11 is a block diagram of an information-gathering system according to a third embodiment of the present invention.

FIG. 11 is a block diagram of an information-gathering system according to a third embodiment of the present invention. In comparison with the information-gathering system 10 according to the second embodiment, a mouse controller 27c is added in the administrator terminal 20 of the information-gathering system 10 according to the third embodiment.

The mouse controller 27c controls the operations of the mouse button and the mouse cursor on the link to an event-driven web-page. The event-driven web-page is operated by script when the mouse action occurs on the web page, which is accessed based on URL stored in the gathered-address table 24a.

The motion event of the mouse cursor can be caused by controlling the motion of the mouse cursor in two dimension (or three dimension), and the click event of the mouse button can be caused by controlling the click of the mouse button and the motion of the mouse cursor simultaneously.

Figure 12:
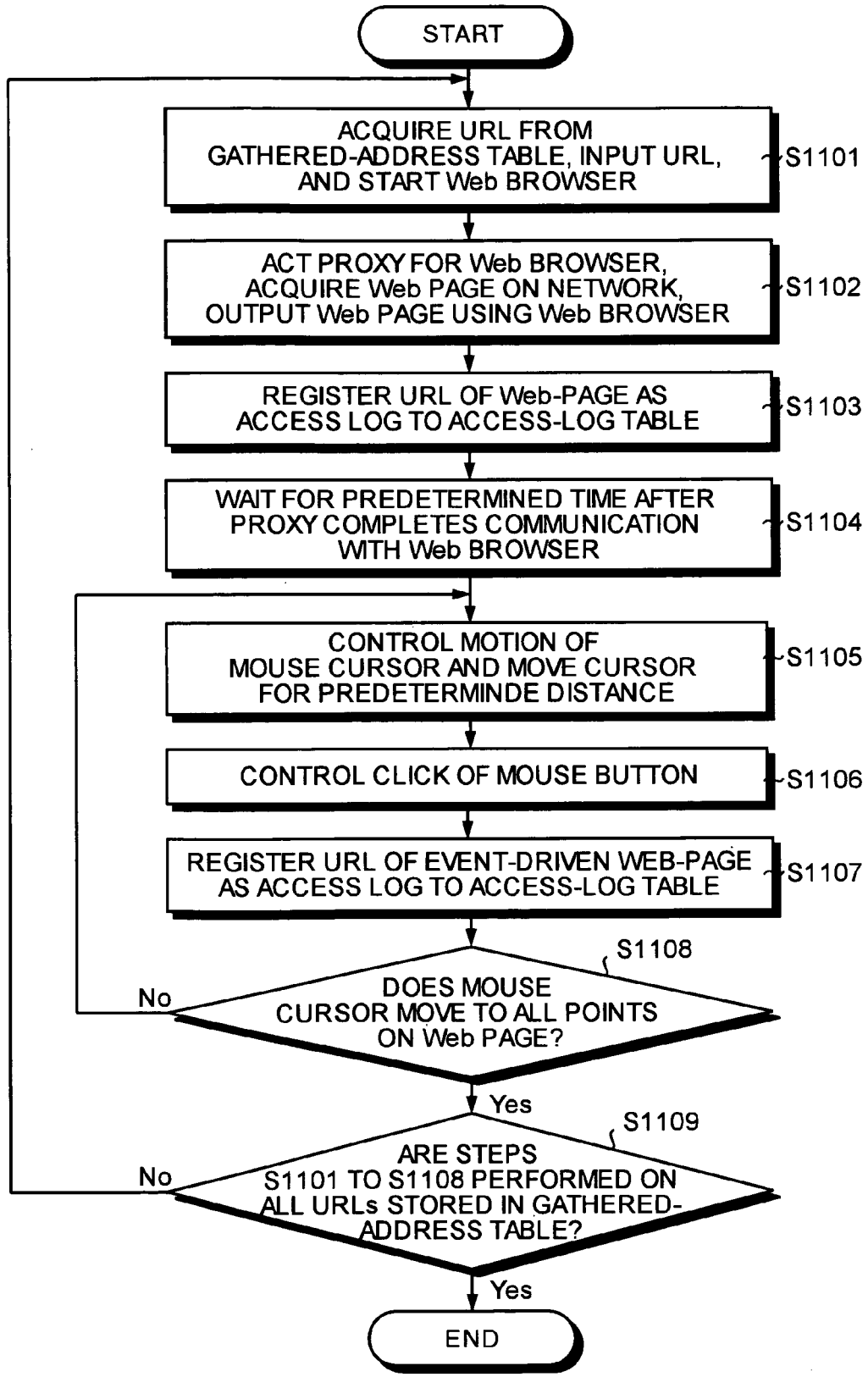
FIG. 12 is a flowchart of an access log acquiring process according to the third embodiment.

FIG. 12 is a flowchart of an access log acquiring process according to the third embodiment. The access-log acquiring unit 27a acquires the URL from the gathered-address table 24a and boots the web browser by inputting the URL (step S1101), and then acts proxy for the web browser, acquires the web page on the internet, and outputs the web page using the web browser (step S1102), and subsequently, registers the URL of the web page with the access-log table 24b as an access log (step S1103).

After the PROXY 27 completes the communication with the web browser, the access-log acquiring unit 27a waits till the scrip web-page is output (step S1104). After the script web-page is output, the address of the script web-page is acquired as an access log and registered with the access-log table 24b.

Subsequently, the mouse controller 27c controls the motion of the mouse cursor and moves the mouse cursor for a certain distance (step S1105), and controls the click of the mouse button (step S1106). (Regarding the step 1105, for example, the mouse controller 27c moves the mouse cursor 27c for every 10 dots from the upper-left point of the web page.)

Consequently, the event-driven web-page is output and the address of the event-driven web-page is registered with the access-log table 24b (step S1107).

If the mouse cursor moves to all points on the web page (step S1108/Yes), and if the steps S1101 to S1108 are performed on all URLs stored in the gathered-address table 24a (step S1109), the operations end. Subsequently, the operations for determining whether the URL stored in the access-log table 24b is stored in the gathered-address table 24b, the operations for registering the ungathered web-page with the ungathered-address table 32c, and the operations for gathering the ungathered web-page based on the ungathered-address table 32c, are performed in the same way as the second embodiment.

According to the information-gathering system according to the third embodiment, in the administrator terminal, the motions of the mouse cursor and the mouse button are controlled on the link to the event-driven web-page. Consequently, when it is detected that the event-driven web-page misses being gathered, the event-driven web-page can be gathered efficiently.

Figure 13:
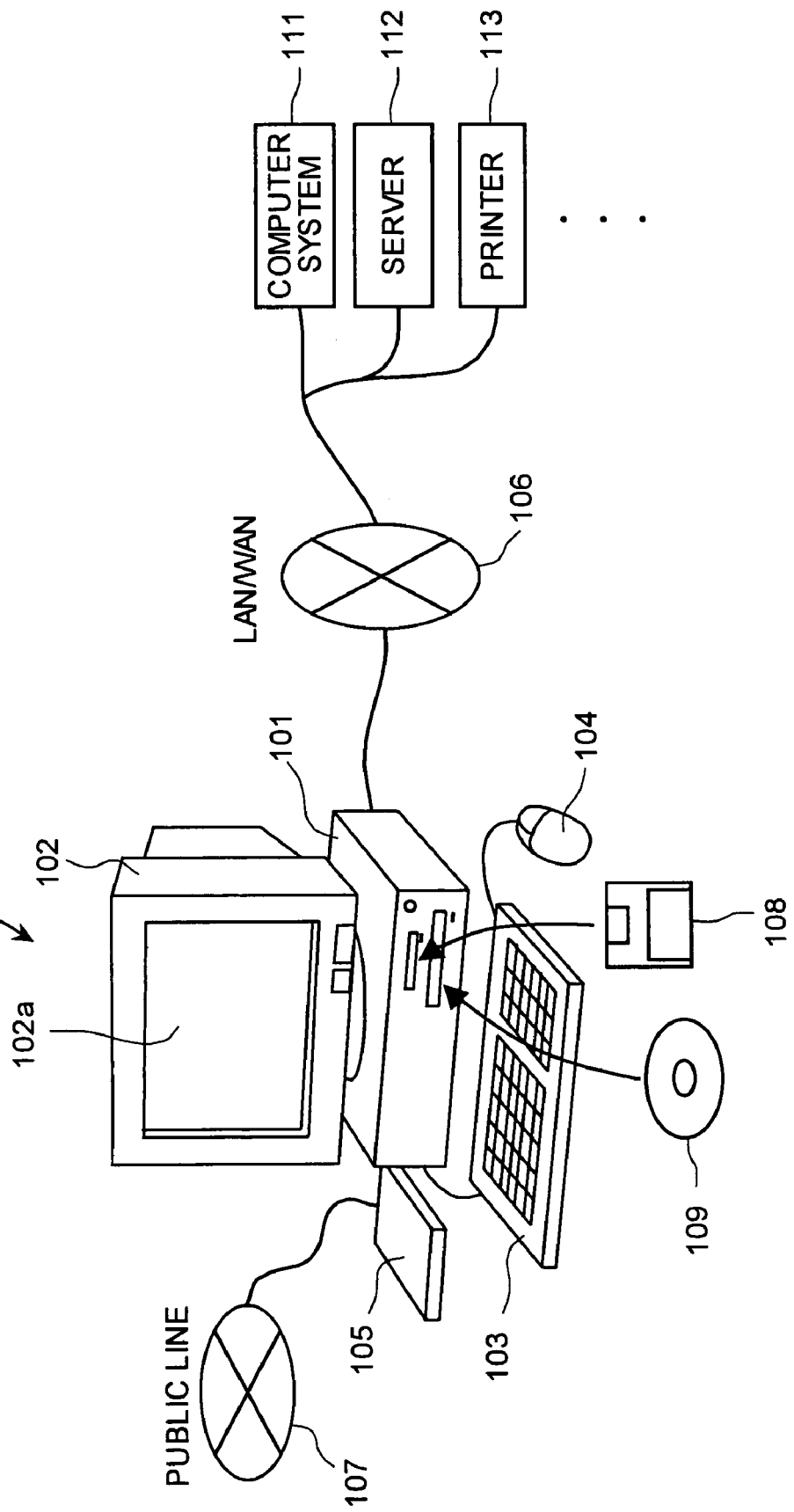
FIG. 13 is a schematic of a computer system according to a fourth embodiment of the present invention.
Figure 14:
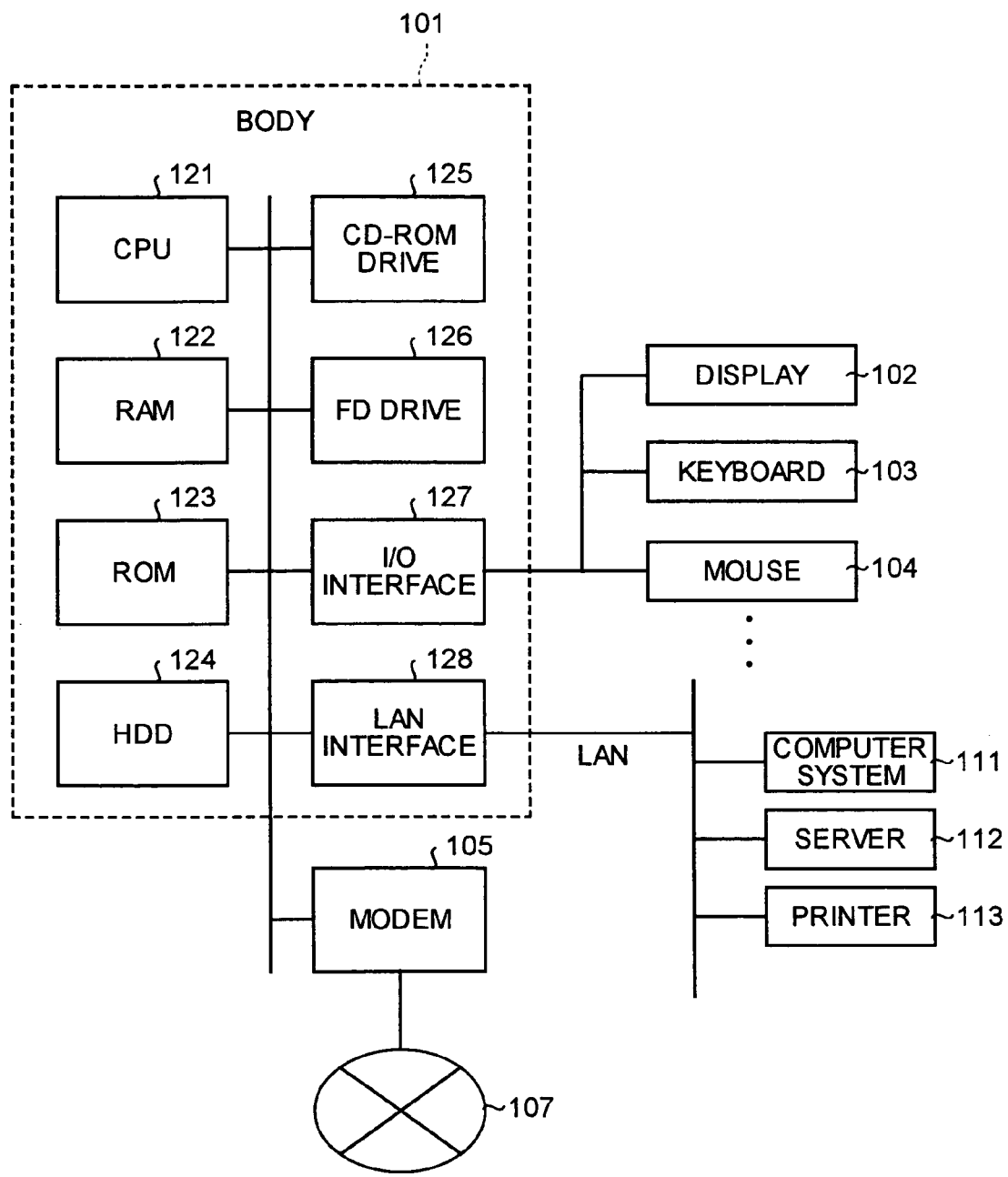
FIG. 14 is a block diagram of a main unit of the computer system shown in FIG. 13.

FIG. 13 is a schematic of a computer system according to a fourth embodiment of the present invention. The computer system 100, such as a personal computer and a workstation, executes the information-gathering computer program to realize the information-gathering system and the information-gathering apparatus (the information-gathering method) according to the first embodiment to third embodiment. FIG. 1-4 is a block diagram of a main unit of the computer system shown in FIG. 13. The computer system 100 includes the main unit 101, a display 102, which displays an image or the like on a screen 102a based on commands from the main unit 101, a keyboard 103, which is used to input various types of information to the computer system 100, and a mouse 104, which is used to specify any points on the screen 102a.

The main unit 101 includes a Central Processing Unit (CPU) 121, a Random Access Memory (RAM) 122, a Read Only Memory (ROM) 123, a Hard Disk Drive (HDD) 124, a Compact-Disk Read-Only-Memory drive (CD-ROM drive) 125, where a CD-ROM is inserted, a floppy disk drive (FDD) 126, where a floppy disk (FD) is inserted, an Input/Output interface (I/O interface) 127, to which the display 102, the keyboard 103, and the mouse 104 are connected, and a Local Area Network interface (LAN interface) 128, which is connected to a Local Area Network/Wide Area Network (LAN/WAN) 106.

Moreover, a modem 105, which connects the computer system 100 to a public line 107 like an internet, and another computer system 111, a server 112, and a printer 113 are connected to the main unit 101 via the LAN/WAN 106.

The computer system 100 reads the information-gathering computer program stored in a certain recoding media and executes the information-gathering computer program, so that the computer system 100 realizes the information-gathering system (information-gathering method). The examples of the recording media are the portable physical-media, such as the FD 108, the CD-ROM 109, an Magneto-Optical (MO) disk, a Digital Versatile Disk (DVD), and an Integrated Circuit (IC) card, the immovable physical-media, such as the HDD 124, which is arranged inside or outside the computer system 100, the RAM 122, and the ROM 123, the communication media, which holds the computer program temporarily during the transmission of the computer program, such as the public line 107 and the LAN/WAL 106.

In this manner, the information-gathering computer program is stored in the recording media to be computer-readable. The computer system 100 realizes the information gathering system and the information-gathering apparatus (the information-gathering method) by reading the information-gathering computer program from the recording media and executing the information-gathering computer program. The apparatus that executes the information-gathering computer program according to the present invention is not be limited to the computer system 100 but may be other computer systems such as the computer system 111, the server 112, and any combinations of the computer system 100, the computer system 111, and the server 112.

The present invention is not limited to the first embodiment to the fourth embodiment, but may have other embodiments as far as the embodiments are within the scope of the technical idea described in the scope of claims.

For example, although the operations for performing the access-log acquiring process and the determining process are treated as a separate process in the second embodiment and the third embodiment, the present invention is not thus limited and the access-log acquiring process and the determining process may be performed in the same process.

Although the memory 24 and the PROXY 27 are arranged in the administrator terminal 20 in the second embodiment and the third embodiment, the present invention is not thus limited and the memory 24 and the PROXY 27 do not have to be arranged in the administrator terminal 20.

Furthermore, the operations that are performed automatically in the first embodiment to the fourth embodiment may be performed manually, and the operations that are performed manually in the first embodiment to the fourth embodiment may be performed automatically. The information, such as the various processes, the assigned names, the various types of data and parameters, are variable as far as the information is not specified.

Moreover, the configurations of each apparatus are shown in the accompanying diagrams from a functional viewpoint, and each apparatus does not have to be configured to be the same physically. Each apparatus is not limited to have the configuration shown and may be separated or integrated physically and functionally based on the load and the usage of each apparatus. Moreover, the operations performed on each apparatus are realized by the CPU or the wired logic (hardware).

In the information-gathering computer program according to the present invention, 1) the gathered web-page and the address of the gathered web-page are stored in a correlated manner in the web archive;
2) the address of the linked web-page specified in the web page that is being referred is acquired from the terminal;
3) whether the linked web-page is stored in the web archive is determined; and
4) the linked web-page is gathered via the network based on the address of the linked web-page when it is determined that the linked web-page is not stored in the web archive.

Consequently, the information-gathering computer program that gathers the missed web-page efficiently can be acquired.

Furthermore, in the information-gathering computer program according to the present invention, 1) the gathered web-page is stored in the web archive while correlating the address of the gathered web-page and the generation information of the gathered web-page;
2) the information is acquired from the terminal based on the address of the linked web-page specified in the web page that is being referred and the generation information of the web page that is being referred; and
3) whether the linked web-page is stored in the web archive is determined.

Consequently, the information-gathering computer program that gathers the missed web-page efficiently can be acquired.

Moreover, in the information-gathering computer program according to the present invention, 1) the address of the gathered web-page is acquired from the server that includes the web archive, which stores the gathered web-page and the address of the gathered web-page in a correlated manner;

2) the address of the linked web-page is acquired as an access log by accessing the web page whose address is stored in the gathered-address table and accessing the linked web-page in the web page;
3) whether the address of the linked web-page is stored in the gathered-address table is determined; and
4) the linked web-page is gathered via the network based on the address of the linked web-page when it is determined that the address of the linked web-page is not stored in the gathered-address table.

Consequently, the information-gathering computer program that gathers the missed web-page efficiently can be acquired.

Furthermore, in the information-gathering computer program according to the present invention,
1) the address of the script web-page is acquired as an access log by accessing the web page whose address is stored in the gathered-address table and accessing the script web-page in the web page;
2) whether the address of the script web-page is stored in the gathered-address table is determined; and
3) the script web-page is gathered via the network based on the address of the script web-page when it is determined that the address of the script web-page is not stored in the gathered-address table.

Consequently, the information-gathering computer program that efficiently gathers the script web-page when it is detected that the script web-page misses being gathered can be acquired.

Moreover, the information-gathering computer program according to the present invention, the motion of the mouse cursor and the motion of the mouse button are controlled on the link of the event-driven web-page in the gathered web-page. Consequently, the information-gathering computer program that efficiently gathers the event-driven web-page when it is detected that the event-driven web-page misses being gathered can be acquired.

Furthermore, in the information-gathering system according to the present invention,
1) the gathered web-page is stored in the web archive while correlating the address of the gathered web-page and the generation information of the gathered-web-page;
2) whether the linked web-page specified in the web page that is being referred is stored in the web archive is determined based on the address of the linked web-page and the generation information of the web page that is being referred; and
3) the linked web-page is gathered via the network based on the address of the linked web-page when it is determined that the linked web-page is not stored in the web archive.

Consequently, the information-gathering system that gathers the missed web-page efficiently can be acquired.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information-gathering apparatus comprising:
a storing unit that acquires information on a first address of a first web-page from a server having a web archive that stores the first address and the first web-page corresponding to the first address, and stores the first address in a gathered-address table;
an access-log acquiring unit that accesses the first web-page based on the first address stored in the gathered-address table, accesses from the first web-page a second web-page linked to the first web-page, and acquires a second address of the second web-page as an access log;
a determining unit that determines whether the second address is stored in the gathered-address table; and
an information gathering unit that gathers the second web-page via the network based on the second address when the second address is not stored in the gathered-address table,
wherein the access-log acquiring unit accesses a script web-page that is operated by script when the first web-page is output, and acquires an address of the script web-page as an access log,
the determining unit determines whether the address of the script web-page is stored in the gathered-address table, and
the information gathering unit gathers the script web-page via the network based on the address of the script web-page when the address of the script web-page is not stored in the gathered-address table.

2. An information-gathering method comprising:
acquiring information on a first address of a first web-page from a server having a web archive that stores the first address and the first web-page corresponding to the first address;
storing the first address in a gathered-address table;
accessing the first web-page based on the first address stored in the gathered-address table;
accessing from the first web-page a second web-page linked to the first web-page;
acquiring a second address of the second web-page as an access log;
determining whether the second address is stored in the gathered-address table; and
gathering the second web-page via the network based on the second address when the second address is not stored in the gathered-address table,
wherein the accessing a second web-page step includes accessing a script web-page that is operated by script when the first web-page is output,
the acquiring a second address step includes acquiring an address of the script web-page as an access log,
the determining step includes determining whether the address of the script web-page is stored in the gathered-address table, and
the gathering step includes gathering the script web-page via the network based on the address of the script web-page when the address of the script web-page is not stored in the gathered-address table.

3. An information-gathering program recorded on a computer readable medium, said program, when executed by a processor, making a computer execute steps comprising:
acquiring information on a first address of a first web-page from a server having a web archive that stores the first address and the first web-page corresponding to the first address;
storing the first address in a gathered-address table;
accessing the first web-page based on the first address stored in the gathered-address table;
accessing from the first web-page a second web-page linked to the first web-page;
acquiring a second address of the second web-page as an access log;

determining whether the second address is stored in the gathered-address table; and gathering the second web-page via the network based on the second address when the second address is not stored in the gathered-address table, wherein the accessing a second web-page step includes accessing a script web-page that is operated by script when the first web-page is output, the acquiring a second address step includes acquiring an address of the script web-page as an access log, the determining step includes determining whether the address of the script web-page is stored in the gathered-address table, and the gathering step includes gathering the script web-page via the network based on the address of the script web-page when the address of the script web-page is not stored in the gathered-address table.

4. The information-gathering program according to claim 3, further making the computer execute a step of controlling at least one of a motion of a mouse cursor and a motion of a mouse button with respect to a link to an event-driven web-page that is operated by script when a mouse action occurs on the first web-page based on the first address stored in the gathered-address table.

* * * * *